(12) United States Patent
Velinsky et al.

(10) Patent No.: US 7,868,610 B2
(45) Date of Patent: Jan. 11, 2011

(54) ANGULAR MOTION TRACKING SENSOR

(75) Inventors: Steven A. Velinsky, Davis, CA (US);
Danny Lee, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 663 days.

(21) Appl. No.: 11/761,112

(22) Filed: Jun. 11, 2007

(65) Prior Publication Data

US 2007/0295089 A1    Dec. 27, 2007

Related U.S. Application Data

(60) Provisional application No. 60/812,470, filed on Jun. 9, 2006.

(51) Int. Cl.
*G01B 7/30* (2006.01)
(52) U.S. Cl. .................. 324/207.25; 324/244; 324/260
(58) Field of Classification Search ........................ None
See application file for complete search history.

(56) References Cited

U.S. PATENT DOCUMENTS

| | | | | |
|---|---|---|---|---|
| 3,618,399 A | * | 11/1971 | Aske ........................ | 73/504.07 |
| 5,237,872 A | * | 8/1993 | Rademakers .............. | 73/504.07 |
| 5,253,525 A | * | 10/1993 | Fukui et al. ............... | 73/504.08 |
| 5,476,018 A | * | 12/1995 | Nakanishi et al. .............. | 74/5.7 |
| 5,517,430 A | * | 5/1996 | Lewis .......................... | 702/150 |
| 6,912,475 B2 | * | 6/2005 | Moriya et al. ................ | 702/150 |
| 7,219,547 B2 | * | 5/2007 | Suzuki ...................... | 73/504.04 |
| 2009/0089001 A1 | * | 4/2009 | Lin ............................. | 702/92 |

OTHER PUBLICATIONS

S.M. Donecker et al. A mechatronic sensing system for vehicle guidance and control. IEEE/ASME Transactions on Mechatronics, vol. 8, No. 4, Dec. 2003, pp. 500-510.

* cited by examiner

*Primary Examiner*—Jay M Patidar
(74) *Attorney, Agent, or Firm*—John P. O'Banion (57) ABSTRACT

A motion tracking sensor apparatus configured for real-time, three-dimensional angular motion tracking that can determine the absolute orientation, axis of rotation and angular speed of a body rotating about a point, which is fixed relative to the sensor, without contacting the rotating body. The sensor obtains measurements of the three-dimensional magnetic field of a dipole fixed on the body. In one embodiment, a permanent magnet is embedded in the center of the rotating body, and the time-varying magnetic field is measured as the magnet rotates, and then the instantaneous magnet orientation from the field data is determined. The apparatus is particularly suited for use with devices that are based on a sphere rotating in a cradle such as spherical motors or spherical variable transmissions.

8 Claims, 11 Drawing Sheets

ANGULAR MOTION TRACKING SENSOR

CROSS-REFERENCE TO RELATED APPLICATIONS

This application claims priority from U.S. provisional application Ser. No. 60/812,470, filed on Jun. 9, 2006, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to the tracking of three-dimensional rotation, and more particularly to a real-time, non-contacting, three-dimensional, angular velocity sensor used in combination with a body rotating about a point which is fixed relative to the sensor.

2. Description of Related Art

In the literature, there are a variety of devices based on a sphere rotating in a cradle. These include: spherical motors, spherical continuously variable transmissions, and omnidirectional vehicles based on the ball wheel mechanism. All of these devices require velocity feedback and would benefit from a non-contacting sensor that can track three-dimensional rotation. However, there is little work on spherical encoders or other means of three-dimensional, orientation feedback without mechanical coupling. In fact, there is no work that addresses three-dimensional, angular velocity feedback of a continuously rotating sphere without a prior knowledge of the rotation axis orientation.

BRIEF SUMMARY OF THE INVENTION

Accordingly, the present invention is a three-dimensional angular motion sensor for a device or body rotating about a fixed point (spherical motion). The fixed point is not fixed in space—the point is fixed relative to the rotating body. Specifically, the absolute orientation of the body as well as the angular speed of the body, which includes the rate and the orientation of the axis of rotation, can be tracked without mechanical coupling to the body. The sensor itself requires measurement of the three-dimensional magnetic field of a dipole fixed on the body. With this data, the orientation of the dipole, the angular speed, and the orientation of the axis of rotation can be calculated.

The sensor is real-time, meaning that it only requires storing 3 sample points to make the calculation and that it involves no iterative algorithms or convergence methods. It is also critical that the sensor can track continuous rotation, like a tachometer.

An aspect of the invention is a motion tracking apparatus configured for real-time, three-dimensional angular motion tracking of an object; wherein the object is configured to engage in spherical motion.

Another aspect of the invention is a motion tracking apparatus configured for determining, in real time and in three dimensions, an angular velocity vector of a rigid body rotating about a fixed point.

Still another aspect of the invention is a motion tracking apparatus, comprising: a sensor; and means for determining an angular velocity vector for an object in real time; wherein the object is configured for spherical motion; and wherein the sensor is not in contact with the object.

One embodiment of this aspect further comprises a magnet coupled to the object; wherein the sensor comprises a tri-axial fluxgate magnetometer. In other embodiments of this aspect, the apparatus is configured for use in biomedical applications, in virtual reality and game applications, in military aircraft applications, or in robotic applications. In another embodiment of this aspect, the sensor is operable in harsh or demanding physical environments. In still another embodiment, the apparatus is configured for tracking continuous motion in real time. In yet another embodiment of this aspect, the sensor takes a single flux density measurement, in three dimensions, of the object; and components of the angular velocity vector are determined from the single flux density measurement.

Another aspect of the invention is a motion tracking apparatus configured for determining an instantaneous axis of rotation and an angular speed for a body from a single flux density measurement, in three dimensions, of the body; wherein the measurement is taken without physical contact of the body. In one embodiment of this aspect, the apparatus is configured to operate in complex ferromagnetic environments.

Another aspect of the invention is an apparatus, comprising: a rigid body configured for rotational movement in three dimensions; means for determining a trajectory of a point on the rigid body; means for determining an angular velocity vector of the rigid body from the trajectory; and means for outputting components of the angular velocity vector.

Another aspect of the invention is an apparatus, comprising: a rigid body configured for rotation in three dimensions; a magnet attached to the rigid body; means, not in contact with the rigid body, for measuring orientation of an axis of the magnet; means for computing real-time angular velocity data from the time-varying magnetic field measurements; and means for outputting the real-time angular velocity data for the rigid body.

Another aspect of the invention is an apparatus, comprising: means, not in contact with a rigid body, for motion tracking of the rigid body; means for measuring a three-dimensional trajectory of a point on the rigid body; means for determining an angular velocity of the rigid body from the trajectory; and means for outputting the angular velocity of the rigid body; wherein the rigid body is capable of rotational motion in three dimensions.

Another aspect of the invention is an apparatus, comprising: a rigid body configured for rotation in three dimensions; a magnet attached to the rigid body; means, not in contact with the rigid body, for measuring a time-varying magnetic field of the magnet; means for computing real-time angular velocity data from the time-varying magnetic field measurements; and means for outputting the real-time angular velocity data for the rigid body.

Another aspect of the invention is a method of tracking motion of a body, wherein the body is configured to engage in spherical motion, comprising: embedding a permanent magnet in the center of the body; measuring the time-varying magnetic field as the magnet rotates; determining the instantaneous magnet orientation from the field measurements; and outputting angular motion data for the body.

Another aspect of the invention is a method, comprising: measuring a three-dimensional trajectory of a point on a rigid body; determining an angular velocity of the rigid body from the trajectory; and outputting the angular velocity of the rigid body; wherein the rigid body is capable of rotational motion in three dimensions.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIGS. 12A-B are graphs illustrating the effects of ambient field compensation in the calculations of the direction cosines.

DETAILED DESCRIPTION OF THE INVENTION

Referring more specifically to the drawings, for illustrative purposes the present invention is characterized in FIG. 1 through FIG. 20. It will be appreciated that the apparatus may vary as to configuration and as to details of the parts, and that the method may vary as to the specific steps and sequence, without departing from the basic concepts as disclosed herein.

1. Introduction

The present invention is a non-contacting, three-dimensional, angular velocity sensor based on magnetometry. The primary application for this sensor is the motion tracking of a robust omnidirectional wheeled mobile platform (OWMP), based on the ball wheel mechanism. This OWMP is developed for a compact, mobile manipulator that will be used for freeway maintenance and construction. The robust OWMP is designed to move at human walking speed, which corresponds to a maximum speed of approximately 1.8 m/s (4 mph). With the geometry of the prototype device, the corresponding ball wheel rotational speed is in the range of 0 Hz to 2 Hz. The admissible error is application specific. The sensor may be used in precision testing in a research environment or as a general purpose tachometer in a field vehicle. Each of these applications will require a different minimum accuracy. Because the OWMP is designed for operation in unstructured environments, the spherical tire will be subject to contamination and wear.

Information on the configuration of a magnetic source provides a means of determining the configuration of the body to which the sources are attached. In this case, the goal is to determine the axis of rotation and angular speed of the sphere given the trajectory of a vector fixed relative to the sphere, or equivalently, assuming a fixed sphere radius, the absolute position of a point on the sphere. This is essentially a problem of inverse kinematics. However, most approaches in the literature describe a process of calculating joint angles given the position of a reference point and the configuration of the rotation axis. For the ball wheel, both the configuration of the rotation axis and the angular displacement about this axis are unknown. Moreover, the values of these quantities can change arbitrarily and instantaneously. To surmount this problem properties of vector orthogonality are used to determine the axis of rotation or center of rotation of three-dimensional limb motion.

Development of the sensor consists of two main components: finding a means of non-contact motion tracking and solving the inverse kinematics problem of spherical motion about an unknown and arbitrary axis of rotation. Optical or vision techniques measure surface displacement, which can be used to derive the tangential surface velocity at a given location. In turn, this tangential velocity information can be used to determine the angular velocity and acceleration of a rigid body in two dimensions. For three-dimensional rotation, the inverse problem becomes ill-conditioned. More specifically, the matrix relating the three-dimensional angular velocity vector and the three-dimensional tangential velocity vector is skew-symmetric and its inverse is undefined. The present invention presents a method to directly calculate angular speed from position data.

Optical or image-processing techniques are common approaches for non-contact motion tracking. However, many optical devices, such as the optical mouse, require a relatively small sensor-to-surface gap, on the order of millimeters. It should be apparent that such a small gap leaves the sensor susceptible to damage or contamination from dirt and other debris. More sophisticated vision systems are based on edge or contrast detection which requires a surface grid or pattern. Both the surface-to-gap constraint and the surface pattern requirement are problematic in unstructured environments.

For non-contact motion tracking in demanding environments, magnetic sensing is commonly employed. Magnetic sensors have been used to track abdominal cavity deflection in crash test dummies as well as helmet motion tracking in aircraft cockpits, and for lateral vehicle guidance in industrial snow plows. These examples demonstrate that magnetic sensing can be effective in highly complex ferromagnetic environments.

As with most motion tracking schemes, the acquired data is a position or an orientation. Determining the angular velocity vector of the sphere is a separate matter. In the present application, the kinematic system can be described as rotation of a rigid-body about a fixed point. Consequently, all other points on the body are in spherical motion. The problem can then be recast as: determining the angular velocity vector of a rigid body given the trajectory of one of its points.

Literature on spatial kinematics or robotics treats this problem often, primarily for calculating joint angles from some desired end-effector position or orientation. Some closed-form and numerical techniques are presented in the literature. However, in all these techniques, the orientation of the rotation axes is known and each joint is limited to a single degree-of-freedom. For example, spherical wrists consists three revolute joints with each rotation axis orthogonal. As a result, each single degree-of-freedom joint can be tracked with an encoder.

Up until the last decade, there appeared to be no results relating a representation of a spherical motion and its angular velocity and acceleration. One source presents a treatment of three-dimensional, rigid-body rotation about an arbitrary axis of rotation, based on invariants of rigid-body transformations. These invariants are used to formulate rotation matrices for spatial kinematics problems. However, this formulation still requires a priori knowledge of the orientation of the rotation axis.

The solution to this inverse kinematics problem herein is based on the natural invariants noted above, but rather than using position data, the algorithm looks at the instantaneous heading of a point on the rigid body. As described below, there is a direct relationship between the axis of rotation and how the heading direction changes over a given sampling period.

It must be stressed that the present invention allows for the tracking of angular motion of a body including angular orientation and angular velocity. Accordingly, a wide variety of applications exist which include, but are not limited to, biomedical applications such as measuring limb motion, head orientation measurement for virtual reality and game applications, measurement of pilot motion such as heads and limbs in military aircraft applications, and a variety of robot applications.

2. Magnetic Sensing

Figure 1:
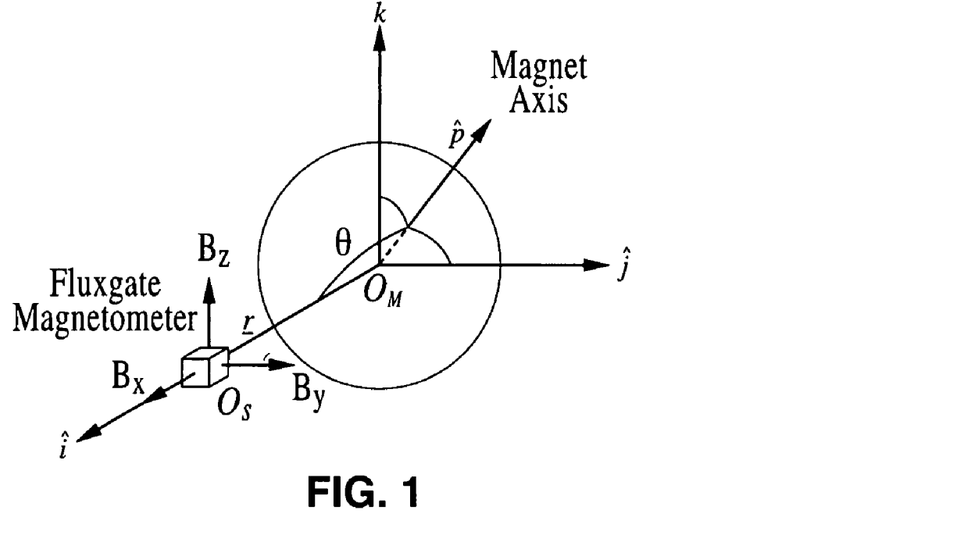
FIG. 1 is a diagram of a proposed magnetic motion-tracking scheme in which the fluxgate magnetometer is used to determine the orientation of the magnet axis according to the present invention.

Development of the angular motion sensor consists of two main tasks: finding a means of non-contact motion tracking and solving the necessary kinematics problem to extract the desired data. As noted above, a magnetic sensing scheme is adopted for its robustness relative to optical methods. Generally, the approach involves: embedding a permanent magnet in the center of the sphere, measuring the time-varying magnetic field as the magnet rotates, and then determining the instantaneous magnet orientation from the field data. A diagram of the system is shown in FIG. 1 and variables used are summarized in Table 1.

The magnet is centered at origin $O_M$ of the inertial reference frame and the sensor is centered at origin $O_S$. The magnet axis is defined by the unit vector $\hat{p}$ and $\underline{r}$ is the position vector from $O_M$ to $O_S$. The magnetometer measures the three-dimensional magnetic flux density vector of a cylindrically-symmetric ferromagnet, which will be modeled as an ideal magnetic dipole. Generally, the theoretical field equations are a function of six configuration variables and physical properties of the magnet. Furthermore, it will be assumed that the sphere and the magnet are both fixed in translation and both are perfectly centered at the origin of the inertial reference frame. For this analysis, $\hat{p}$ will be represented with the direction cosines $\{l,m,n\}$.

Figure 2:
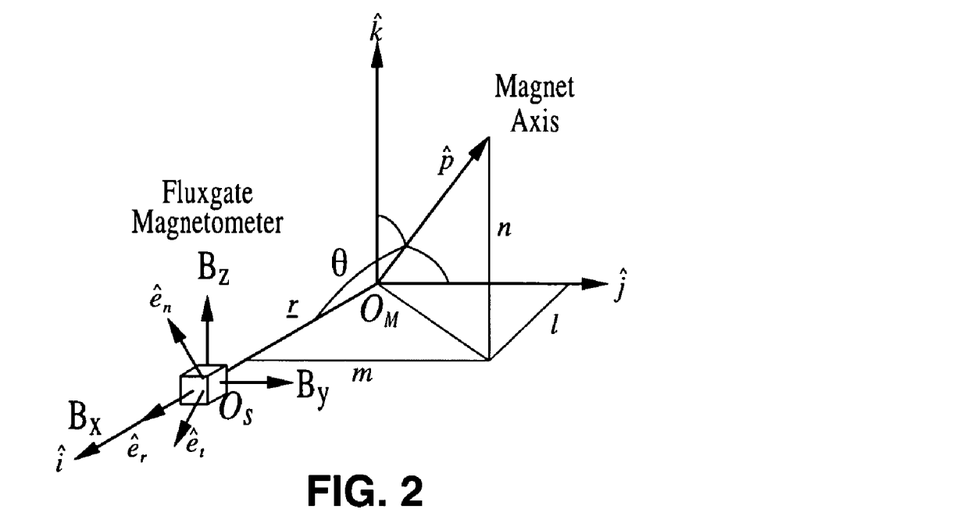
FIG. 2 is a diagram defining the rotating, radial-tangential coordinate system placed at the sensor origin.
Figure 3:
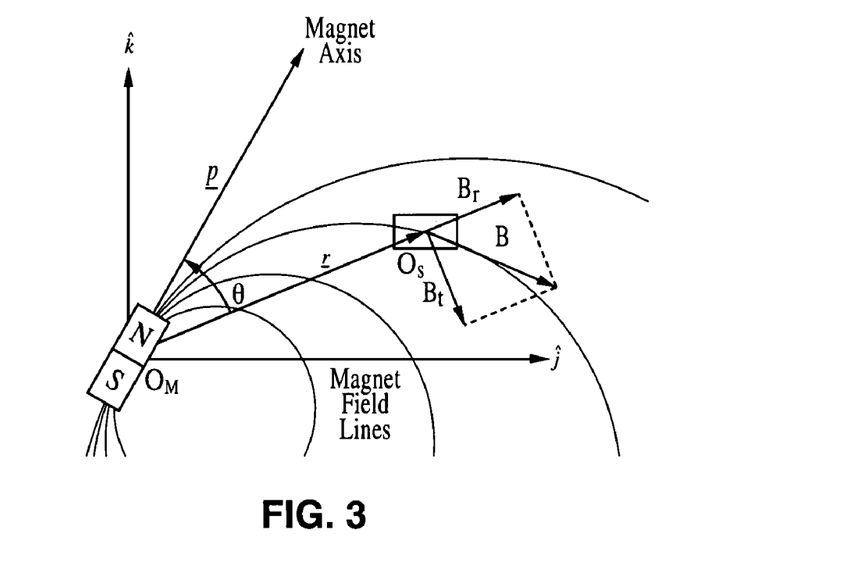
FIG. 3 illustrates the radial and tangential field components of the flux density vector in two dimensions.

In general, the flux density vector at $O_S$ is three-dimensional. However, due to the cylindrical symmetry of an ideal dipole field, the flux density vector can be described using radial and tangential components in a plane containing $\hat{p}$ and $\underline{r}$. In FIG. 2, this plane is denoted by unit vector $\hat{e}_n$. Unit vectors $\hat{e}_r$ and $\hat{e}_t$ represent the radial and tangential directions, respectively. The relationship between the flux density vector and the configuration of the system is shown in FIG. 3.

The angle $\theta$ is the relative orientation between $\hat{p}$ and $\underline{r}$, in the $\hat{e}_n$-plane. The theoretical expressions for the radial and tangential field components, $B_r$ and $B_t$, respectively, are $$B_r = \frac{\mu_0 M}{2\pi \|r\|^3} \cos\theta \qquad (1)$$

$$B_t = \frac{\mu_0 M}{4\pi \|r\|^3} \sin\theta \qquad (2)$$

where $\mu_0$ is the permeability constant and M is the magnetic dipole moment. The relationship between the field components and the configuration variables can be found in most texts on electromagnetic fields.

In the three-dimensional case, the unit vectors $\{\hat{e}_r, \hat{e}_n, \hat{e}_t\}$ are calculated as follows:

$$\hat{e}_r = \frac{r}{\|r\|} \qquad (3)$$

$$\hat{e}_n = \frac{\hat{e}_r \times \hat{p}}{\|\hat{e}_r \times \hat{p}\|} \qquad (4)$$

$$\hat{e}_t = \hat{e}_r \times \hat{e}_n \qquad (5)$$

Note that in Eq. 4, $\hat{e}_r$ and $\hat{p}$ are not orthogonal, in general; as a result, their vector product must be normalized to ensure that $\hat{e}_n$ has unit magnitude. However, $\hat{e}_r$ and $\hat{e}_n$ are orthogonal at all times and the vector product to calculate $\hat{e}_t$ does not require normalization. If the vector product of Eq. 4 is carried out, $\hat{e}_t$ in Eq. 5 can be expressed as $$\hat{e}_t = \frac{1}{\|\hat{e}_r \times \hat{p}\|}[(\hat{e}_r \cdot \hat{p})\hat{e}_r - \hat{p}] \quad (6)$$

Moreover, the trigonometric functions in Eq. 1 and Eq. 2 can also be expressed as a function of $\hat{p}$; as such, $$\cos\theta = \hat{e}_r \cdot \hat{p} \quad (7)$$

$$\sin\theta = \|\hat{e}_r \times \hat{p}\| \quad (8)$$

For an arbitrary orientation of $\hat{p}$, the theoretical magnetic flux density vector, $\underline{B}_{TH}$, can be expressed as $$\underline{B}_{TH} = B_r \hat{e}_r + B_t \hat{e}_t \quad (9)$$

Substituting Eq. 3, Eq. 6, Eq. 7, and Eq. 8 into Eq. 9 results in the following expression:

$$\underline{B}_{TH} = \frac{3\mu_0 M}{4\pi\|\underline{r}\|^5}[(\underline{r}\cdot\hat{p})\underline{r}] - \frac{\mu_0 M}{4\pi\|\underline{r}\|^3}\hat{p} \quad (10)$$

The geometry of the field equations is greatly simplified if the sensor is placed along one of the coordinate axes. Let the x-component of the magnetic sensor be aligned with the x-axis of the inertial reference frame; as such, $$\hat{e}_r = [1,0,0]^T \quad (11)$$

Making this substitution, Eq. 10 becomes $$B_{TH} = \begin{bmatrix} \frac{\mu_0 M}{2\pi r^3} l \\ \frac{-\mu_0 M}{4\pi r^3} m \\ \frac{-\mu_0 M}{4\pi r^3} n \end{bmatrix} \quad (12)$$

which is an expression for the three-component flux density vector of a magnet defined by axis vector $\hat{p}$, represented by the direction cosines $\{l,m,n\}$. Assuming that theoretical flux density vector, Eq. 12, accurately represents the actual measured field, the direction cosines can be directly calculated from:

$$\begin{bmatrix} l \\ m \\ n \end{bmatrix} \approx \begin{bmatrix} \frac{2\pi r^3}{\mu_0 M}(B_x)_M \\ \frac{-4\pi r^3}{\mu_0 M}(B_y)_M \\ \frac{-4\pi r^3}{\mu_0 M}(B_z)_M \end{bmatrix} \quad (13)$$

where $(B_x)_M$, $(B_y)_M$, and $(B_z)_M$ are the measured field components in the x, y, and z directions, respectively. The use of the approximation sign reflects general modeling error, such as modeling the permanent disc magnet as an ideal dipole. Eq. 13 states that the expression for the direction cosines of $\hat{p}$ are uncoupled and linearly proportional to the field measurements. In other words, this scheme directly tracks the orientation of $\hat{p}$, and consequently the orientation of any rigid body to which the magnet is attached.

2.1. Magnetometer Sensing Element Offsets

Figure 4:
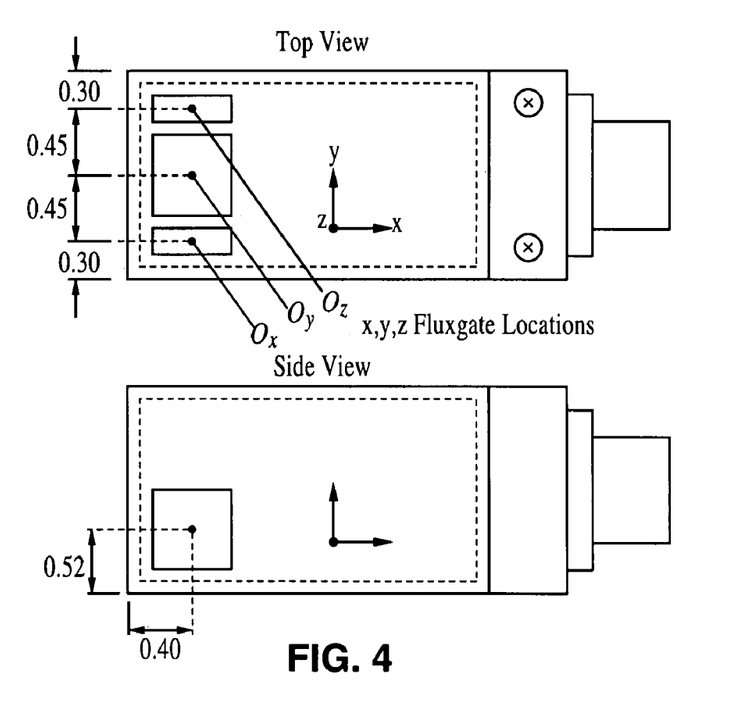
FIG. 4 illustrates the physical offsets of the x, y, and z fluxgates in an APS 535 Magnetometer.

In the previous section, the x, y, and z sensing elements are assumed to be coincident. Physically, however, geometric offsets exist between the fluxgates, as shown in FIG. 4.

Figure 5:
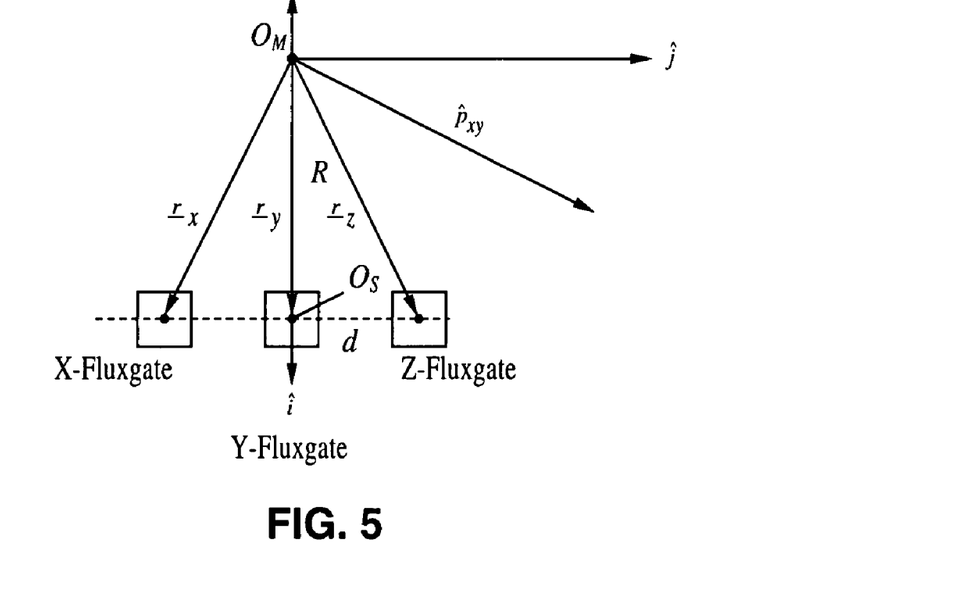
FIG. 5 illustrates the fluxgate locations relative to the inertial reference frame.

As a result, the position vector from the magnet origin to each fluxgate will differ. To address this issue, the theoretical flux density vector is calculated at the origin of each fluxgate and then projected along the active sensing direction. A diagram of planar offsets is shown in FIG. 5.

At this juncture, a vertical offset h of the sensor origin relative to the magnet origin is added. For tracking the motion of the ball wheel mechanism, the relative distance between the ball wheel and the chassis could change under deformation. However, it is assumed that this relative deformation is approximately constant during operation. In other applications, spatial constraints could prevent perfect alignment of the sensor origin and the magnet origin. As long as the offsets are known and constant, the variation in the signal can be accounted for.

The radial vector from the magnet origin to the origin of each sensor element is expressed as $$\left\{ \underline{r}_x = \begin{bmatrix} R \\ -d \\ -h \end{bmatrix} \quad \underline{r}_y = \begin{bmatrix} R \\ 0 \\ -h \end{bmatrix} \quad \underline{r}_z = \begin{bmatrix} R \\ d \\ -h \end{bmatrix} \right\} \quad (14)$$

Next, the analysis in the previous section is carried for each fluxgate location. In summary, this process involves: attaching an orthogonal triad to each element origin, expressing the relative orientation between the magnet axis and the associated position vector, in terms of the direction cosines and geometric offsets, and substituting these values into the field equations; as such, $$(B_{TH})_X = \frac{3\mu_0 M}{4\pi\|\underline{r}_x\|^5}[(\underline{r}_x\cdot\hat{p})\underline{r}_x] - \frac{\mu_0 M}{4\pi\|\underline{r}_x\|^3}\hat{p} \quad (15)$$

$$(B_{TH})_Y = \frac{3\mu_0 M}{4\pi\|\underline{r}_y\|^5}[(\underline{r}_y\cdot\hat{p})\underline{r}_y] - \frac{\mu_0 M}{4\pi\|\underline{r}_y\|^3}\hat{p} \quad (16)$$

$$(B_{TH})_Z = \frac{3\mu_0 M}{4\pi\|\underline{r}_z\|^5}[(\underline{r}_z\cdot\hat{p})\underline{r}_z] - \frac{\mu_0 M}{4\pi\|\underline{r}_z\|^3}\hat{p} \quad (17)$$

Next, the theoretical flux density vectors are projected onto the active sensing axis of each fluxgate. These components are then expressed as $$B_x = (\underline{B}_{TH})_X \cdot \hat{i} \quad (18)$$

$$B_y = (\underline{B}_{TH})_Y \cdot \hat{j} \quad (19)$$

$$B_z = (\underline{B}_{TH})_Z \cdot \hat{k} \quad (20)$$

Collecting the coefficients of the direction cosines into a matrix yields $$A = \begin{bmatrix} \dfrac{\mu_0 M(3R^2 - \|r_x\|^2)}{4\pi\|r_x\|^5} & -\dfrac{3\mu_0 MdR}{4\pi\|r_x\|^5} & -\dfrac{3\mu_0 MhR}{4\pi\|r_x\|^5} \\ 0 & -\dfrac{\mu_0 M}{4\pi\|r_y\|^3} & 0 \\ -\dfrac{3\mu_0 MhR}{4\pi\|r_z\|^5} & -\dfrac{3\mu_0 Mdh}{4\pi\|r_z\|^5} & \dfrac{\mu_0 M(3h^2 - \|r_z\|^2)}{4\pi\|r_z\|^5} \end{bmatrix} \quad (21)$$

Then, the theoretical flux density vector, $\underline{B}_{TH}$, can be expressed compactly as:

$$\underline{B}_{TH} = A\hat{p} \quad (22)$$

A is a full rank, constant matrix; as such $\det(A) \neq 0$. The unique solution is $$\hat{p} = A^{-1}\underline{B}_{TH}. \quad (23)$$

3. Inverse Kinematics of Spherical Motion

As with many motion tracking schemes, the output of the proposed sensor is position. Since velocity is desired, the sensor data must be further processed; this includes numerical differentiation to find rates and kinematic analysis to resolve the three-dimensional velocity data to the orientation of the sphere's axis of rotation and the angular rate of rotation about this axis.

Figure 6:
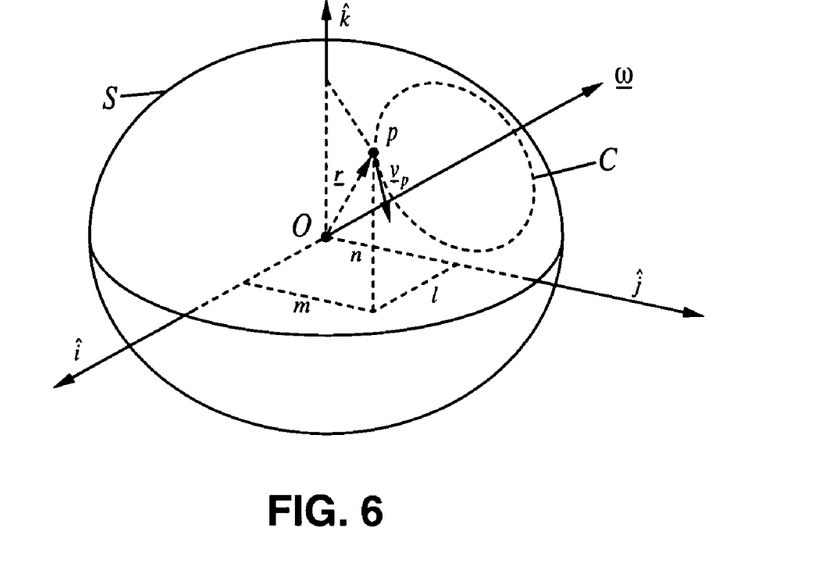
FIG. 6 illustrates the kinematics of spherical motion and defines the direction cosines {l,m,n}.

The present section describes the algorithm used to determine the angular velocity vector of a rigid body rotating about a fixed point. In general, the axis of rotation is three-dimensional and its orientation can change instantaneously and in an arbitrary direction. This is essentially an inverse kinematics problem. A diagram of the kinematic problem formulation is shown in FIG. 6. Consider a point p on the surface of sphere S, which is centered at origin O of an inertial reference frame. The position of p is defined by the vector $\underline{r}$. As S rotates with angular velocity $\underline{\omega}$, point p follows a trajectory defined by the circular arc C with tangential velocity $\underline{v}_p$.

Position vector $\underline{r}$ is represented by the direction cosines $\{l,m,n\}$, which are measured quantities from the described magnetometry scheme.

Figure 7:
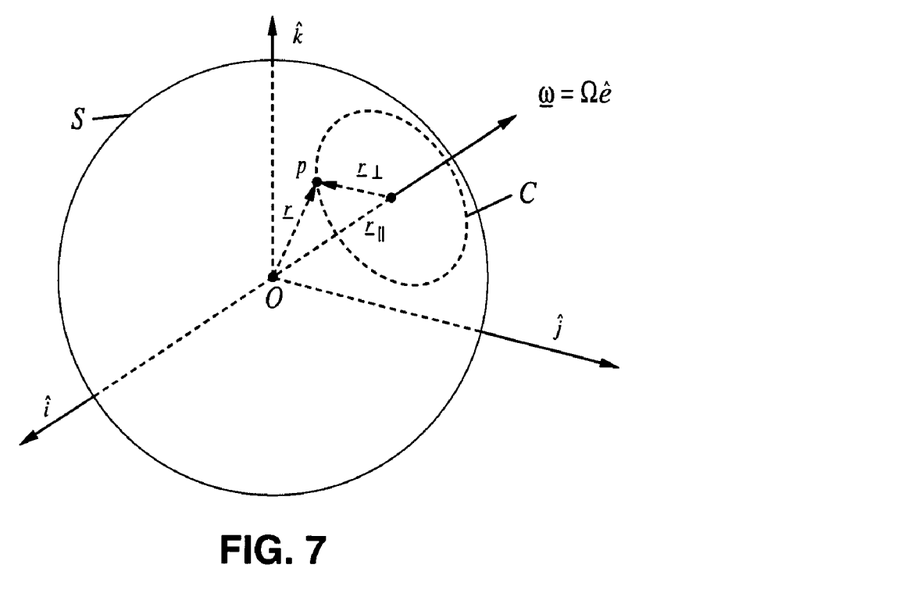
FIG. 7 illustrates the position vector decomposed into parallel and orthogonal components relative to the axis of rotation.

Next, the natural invariants of rigid-body rotation about a fixed point are derived. As shown in FIG. 7, the position vector $\underline{r}$ is decomposed into a component along the axis of rotation and a component normal to the axis rotation, $\underline{r}_\|$ and $\underline{r}_\perp$ respectively.

Figure 8:
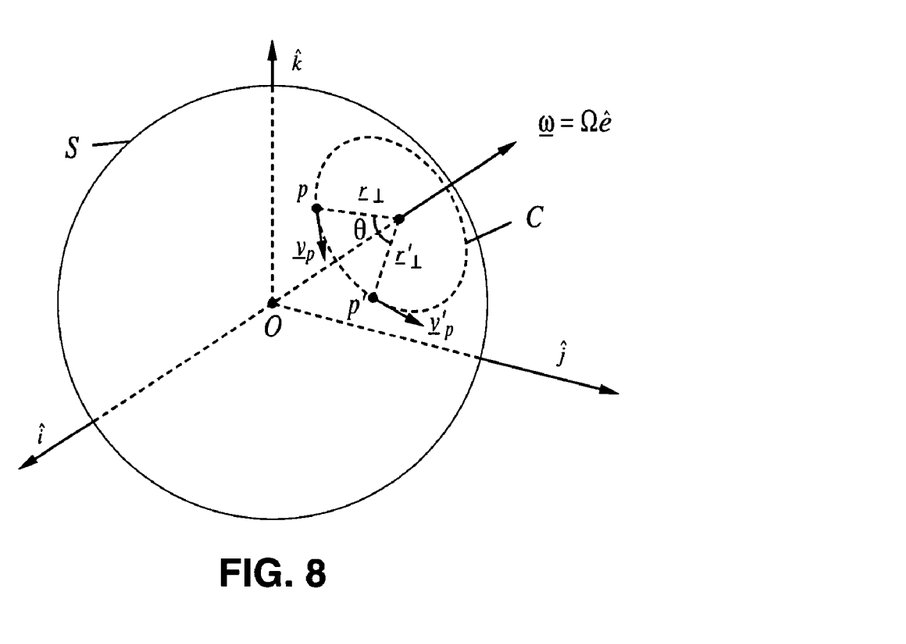
FIG. 8 illustrates the natural invariants of rigid-body rotation about a fixed point.

Explicitly, these components are $$\underline{r}_\| = (\underline{r}\cdot\hat{e})\hat{e} \quad (24)$$

$$\underline{r}_\perp = \underline{r} - (\underline{r}\cdot\hat{e})\hat{e} \quad (25)$$

where $\hat{e}$ is a unit vector parallel to the angular velocity vector $\underline{\omega}$. Through this formulation, the natural invariants $\hat{e}$ and $\theta$ are defined as shown in FIG. 8. The parameter $\theta$ represents the angular displacement of the normal component of the position vector as it rotates from $\underline{r}_\perp$ to $\underline{r}'_\perp$. This is corresponds to the motion of p to p' along an arc length of curve C.

The relationship between the natural invariants and the motion of p can be defined as $$\underline{r}_\perp \times \underline{r}'_\perp = |\underline{r}_\perp||\underline{r}'_\perp|\sin\theta\,\hat{e} \quad (26)$$

where the angle $\theta$ is bounded by $[0, \pi]$ to preserve the proper sign. However, according to Eq. 25, the projection $\underline{r}_\perp$ cannot be made until $\hat{e}$ is known. To circumvent this problem, some general orthogonality relationships of this motion are employed. For rigid-body motion, the tangential velocity vector $\underline{v}_p$ of point p is orthogonal to the position vector $\underline{r}$ at all times. As a result, $\underline{v}_p$ is also orthogonal to $\underline{r}_\perp$. Consequently, the change in orientation of $\underline{r}_\perp$ is equivalent to the change in orientation of $\underline{v}_p$; as such, $$\frac{\underline{r}_\perp \times \underline{r}'_\perp}{|\underline{r}_\perp||\underline{r}'_\perp|} = \frac{\underline{v}_p \times \underline{v}'_p}{|\underline{v}_p||\underline{v}'_p|} \quad (27)$$

At this junction, a discrete analysis is taken, which better illustrates the numerical implementation of the proposed scheme. To do this, the sample index k and the sample period T are introduced into the equations. As a result, Eq. 26 becomes $$\frac{\underline{v}_p[k-1] \times \underline{v}_p[k]}{|\underline{v}_p[k-1]||\underline{v}_p[k]|} = \theta[k]\hat{e} \quad (28)$$

where the small angle approximation $\sin\theta \approx \theta$ for $\theta$ small is made. Eq. 28 is the approximate radian rotation of Body S between each sample. If the samples occur over a period T, the approximate angular velocity vector can be expressed as $$\underline{\omega}([k]T) \approx \frac{\theta([k]T)}{T}\hat{e} \quad (29)$$

For the simplest implementation, a backward difference scheme is used to approximate the tangential velocity vector; as such, $$\underline{v}_p([k]T) = \frac{\underline{\delta}_p([k]T)}{T} \approx \frac{\underline{r}_p([k]T) - \underline{r}_p([k-1]T)}{T} \quad (30)$$

The term $\underline{\delta}_p$ is the displacement of point p, described by position vector $\underline{r}_p$ over one sample period. Using this displacement variable, the angular velocity vector can be expressed as follows:

$$\underline{\omega}([k]T) \approx \frac{1}{T}\frac{\underline{\delta}_p([k-1]T) \times \underline{\delta}_p([k]T)}{|\underline{\delta}_p([k-1]T) \times \underline{\delta}_p([k]T)|} \quad (31)$$

Eq. 31 provides a method to approximate the angular velocity vector of Sphere S, given the absolute position of a point p and assuming the numerical differentiation scheme shown in Eq. 30.

While the differentiation operator is considered an ill-conditioned or ill-posed problem, its applicability is demonstrated extensively in the literature and in engineering practice. Applications include: edge detection of noisy images, tracking of noisy movie data, applications in radar motion tracking, applications in sonar motion tracking, and velocity estimation for control systems.

Figure 9:
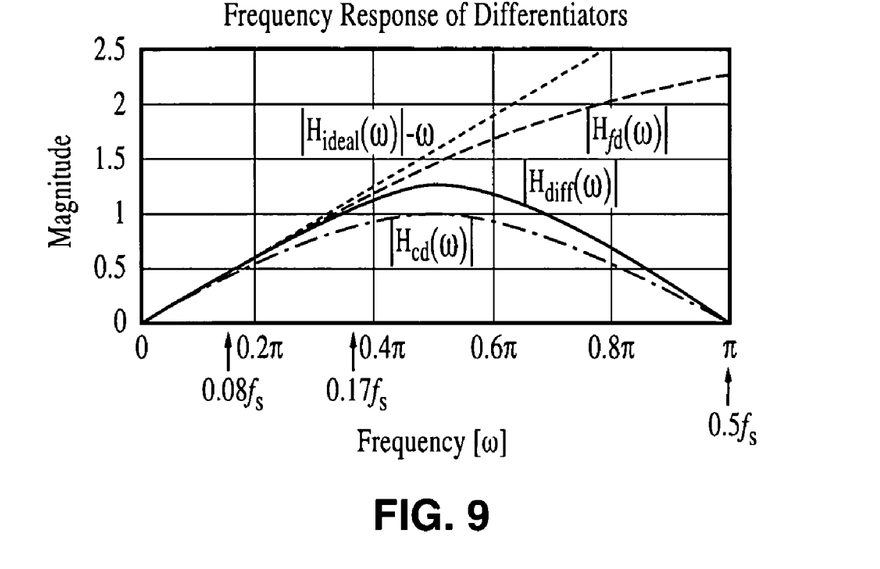
FIG. 9 is a graph of the magnitude response of differentiation filters.

The approach taken here is based on numerical differentiation from the perspective of digital filtering. Generally, the goal is to build a filter that approximates the ideal differentiator at low frequencies, while attenuating the response at higher frequencies, which addresses the high frequency noise amplification. FIG. 9 shows the magnitude frequency response of several differentiators.

$|H_{ideal}(\omega)|=\omega$ is the ideal differentiator, $|H_{fd}(\omega)|$ is the forward difference scheme, $|H_{cd}(\omega)|$ is the central difference scheme, and $|H_{diff}(\omega)|$ is a weighted, multipoint scheme that extends the linear range of the approximation. More specifically, $H_{cd}(\omega)$ effectively approximates the ideal differentiator up to a frequency of 0.08 $f_s$, while $H_{diff}(\omega)$ effectively approximates the ideal differentiator up to a frequency of 0.17 $f_s$, where $f_s$ is the sampling frequency of the system.

4. Experimental Verification Test Apparatus

Figure 10:
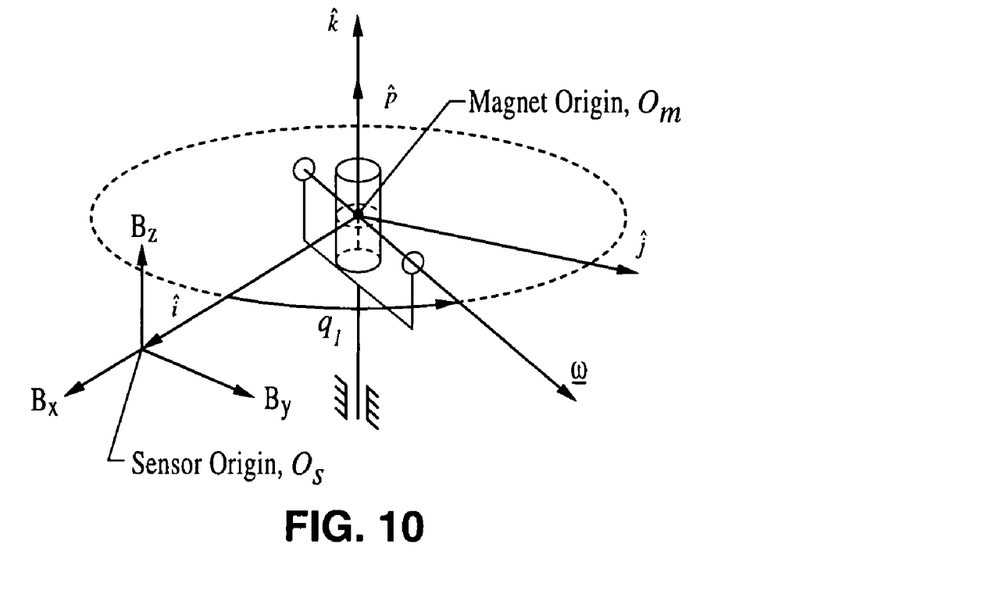
FIG. 10 is a simplified diagram of experimental apparatus defining variables $\omega$ and $q_1$.

The present section is concerned with experimental verification of the non-contact, angular motion sensing scheme. Generally, the approach involves spinning a magnet with a known angular speed and a known relative orientation and then using the magnetic tracking scheme to reproduce these known parameters. A diagram of the experimental set-up is shown in FIG. 10 and key experimental parameters are listed in Table 2.

The position vector $\underline{r}$ defines the position of the magnetometer origin $O_S$ relative to the magnet origin $O_M$, which is centered in the inertial reference frame $\{\hat{\imath}\ \hat{\jmath}\ \hat{k}\}$. The field emanating from the magnet is defined by the orientation of its axis vector, denoted by vector $\hat{p}$. Coordinate $q_1$ is the relative orientation between the position vector $\underline{r}$ and the angular velocity vector $\underline{\omega}$. In summary, the angular speed $\underline{\omega}$ and the angle $q_1$ will be regulated and simultaneously measured with conventional optical encoders and the proposed magnetometry scheme; this comparison will verify the effectiveness of the proposed scheme.

For this work, the axis of rotation will be constrained to the xy-plane; and as a result, the orientation of the rotation axis can be identified by the single angle $q_1$. Also, it is assumed that the magnet axis $\hat{p}$ is orthogonal to the angular velocity vector $\underline{\omega}$ at all times. This constrained system essentially replicates the kinematics of a steered wheel; as such, the proposed sensing scheme is a means of measuring the angular speed and steer angle of a steered wheel without mechanical coupling.

Figure 11:
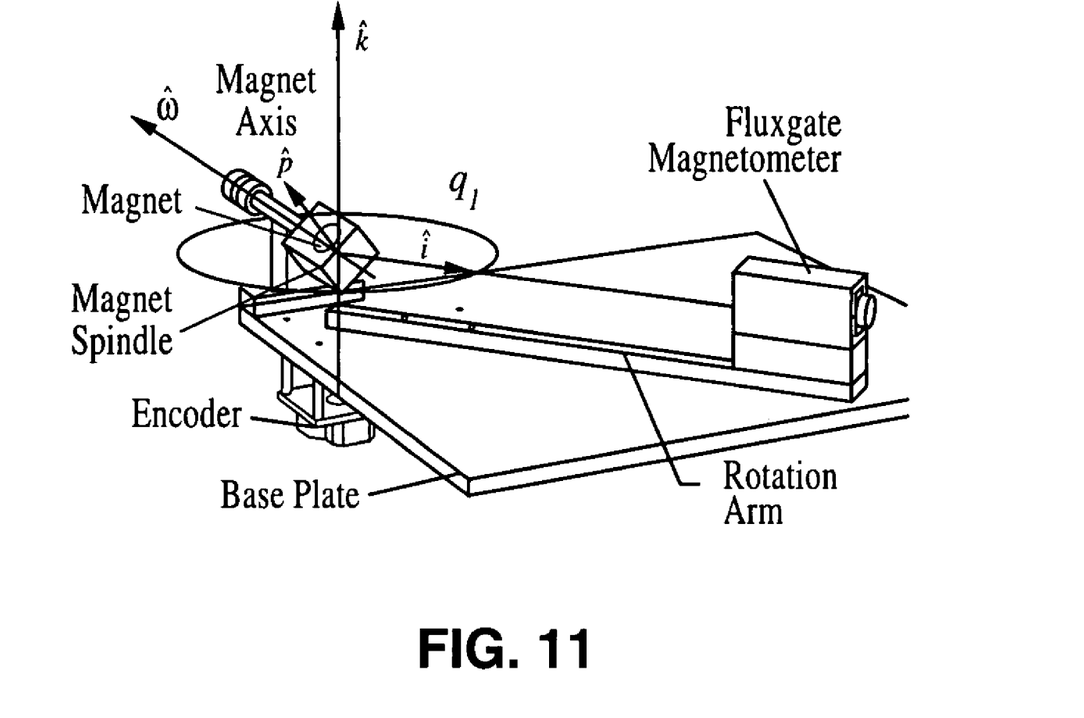
FIG. 11 illustrates the layout of the test apparatus components.
Figure 12:
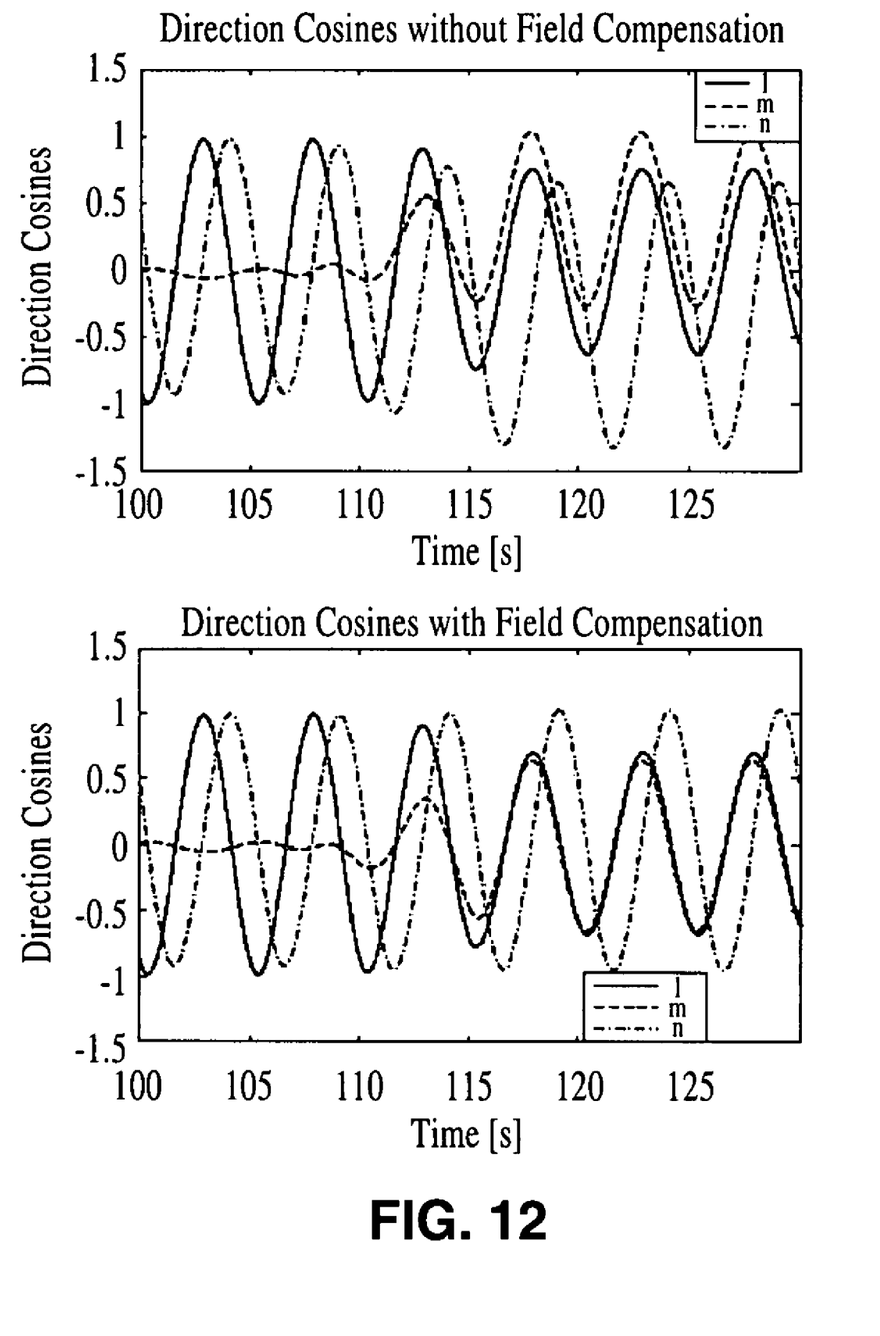
FIG. 12A shows the direction cosines without ambient field compensation.
FIG. 12B shows the direction cosines with ambient field compensation.

FIG. 11 is a diagram of the experimental test apparatus, illustrating the layout of the various components. The servo motor spins the magnet through an 8:1 gear reducer and is equipped with an incremental encoder for velocity feedback. The magnet spindle secures and precisely aligns the magnet relative to the rotation axis and the pivot center of the rotation arm. The fluxgate magnetometer is fastened to the rotation arm though a precision spacer that aligns the magnet origin with the sensor origin in the $\hat{k}$ direction. The pivoting assembly also maintains a radial distance of 30.48 cm (12.00 in) between $O_M$ and $O_S$. The reference measurement for orientation angle $q_1$ is provided by an optical encoder, which is mounted beneath the base plate.

For the experiments, a fluxgate magnetometer is selected for its high sensitivity and low signal-to-noise ratio, as compared to Hall Effect sensors. Specifically, the sensor is an Applied Physics Systems (APS) 535 Fluxgate Magnetometer. Its robust packaging makes the APS 535 ideal for applications in non-ideal environments. Specifications for the sensor are shown in Table 3. The dipole source is a Neodymium Iron Boron Grade 42 disc magnet with a maximum radial flux density of 13,200 Gauss. Physically, the magnet is 2.54 cm (1 in) in diameter and 1.91 cm (0.75 in) thick.

For this work, the actual magnitude of the magnetic field is not critical; it is the relative magnitude of each sensing axis that determines the rotational motion. In fact, the signals are normalized to a unit magnitude, characteristic of direction cosines. However, a relatively large magnetic field provides an improved signal-to-noise ratio.

The magnet spindle is actuated by a brushless servo motor (Parker Compumotor BE342HJ) through a precision gear head from Bayside Motion Products. The motor is driven by a Compumotor Gemini GV servo drive in velocity regulation mode. The controls algorithm and all the digital and analog I/O is programmed in LabVIEW™ Real-Time and run on a National Instruments PXI-8146RT, which has a 266 MHz Pentium processor. The sampling frequency is set to 500 Hz. The sampling rate is limited in this system because the signals from the two reference encoders must be also be sampled in real-time for experimental verification. With the relatively low target speeds, aliasing is not a concern; however, a higher sampling frequency could improve the filtering characteristics of the system.

The servo motor does produce a measurable field but is static and independent of the velocity setting. Since there is relative motion between the servo motor and the magnetometer in this system, it is necessary to account for the field variation with coordinate $q_1$. To do this, the magnet is removed from the collar and field measurements are acquired as $q_1$ is varied over a range of $\pi/4$ radians. A quadratic polynomial fit is sufficient in replicating the ambient field as a function of $q_1$. In the algorithm, the ambient field components are subtracted from the complete signal, leaving behind the time-varying field measurements.

Consider a rotation of the pivot stage from $q_1=0$ to $q_1=\pi/4$. At the end of this motion, direction cosines l and m should be of the same magnitude and in phase, while direction cosine n should be unaltered. FIG. 12A shows the results without compensation; the magnitudes are all erroneous and DC offsets are introduced. FIG. 12B shows the same test with the compensation. Note that the magnitudes of l and m are as expected, the amplitude of n is constant through the motion, and all signals oscillate about zero. It is important to note that in a real application, the magnetometer would be fixed relative to the motor assemblies and such compensation will not be necessary.

While the APS 535 Magnetometer has some internal signal processing, the sampled data passes through a second-order, low-pass digital Butterworth filter to filter out any noise from the DAQ hardware. After the numerical differentiation, the tangential velocity vectors are normalized and the current and previous values of the unit tangents are used to calculate the rotation vector per Eq. 28. After the vector product, the signals are filtered again to eliminate any noise amplification from the calculation.

The phase angle between the $\hat{\imath}$-component and the $\hat{\jmath}$-component of the rotation vector represents the angle $q_1$, which is the relative orientation between the axis of rotation and the sensor frame. The magnitude of the rotation vector, normalized by the period between the successive samples of the unit tangents, is the angular velocity of the magnet. The speed should be equivalent to the motor speed as sensed by the motor encoder.

5. Test Case Results

Here, two test cases are presented. The first case involves a steady precession of the angular velocity vector from $q_1=-\pi/2$ radians to $q_1=-\pi/4$ radians. Secondly, the sensor performance is tested under a step change in velocity. For each case, four plots are presented: the direction cosines of the motion; the differentiated direction cosines, which represents the tangential speed for a unit sphere radius; the magnitudes of $q_1$ and $\|\underline{\omega}\|$; and the error in $q_1$ and $\|\underline{\omega}\|$ between the proposed method and the optical encoder measurement of the same quantity.

These test cases are merely examples according to the present invention, and are not intended to limit the invention to the parameters described herein.

5.1. Velocity Vector Precession

The first result involves precession of the rotation axis from $q_1=-\pi/2$ radians to $q_1=-\pi/4$ radians. As shown in the diagram of the experimental set-up (FIG. 11), the precession involves manually displacing the rotation arm as the magnet is rotating at a constant speed of 0.5 Hz. The orientation of the arm is measured by the optical encoder mounted beneath the base plate. Recall that while the sensor is the body being displaced, its instantaneous orientation still represents the inertial reference frame. Consequently, the negative rotation of the sensor corresponds to a positive rotation of the rotation axis, with the same magnitude.

Figure 13:
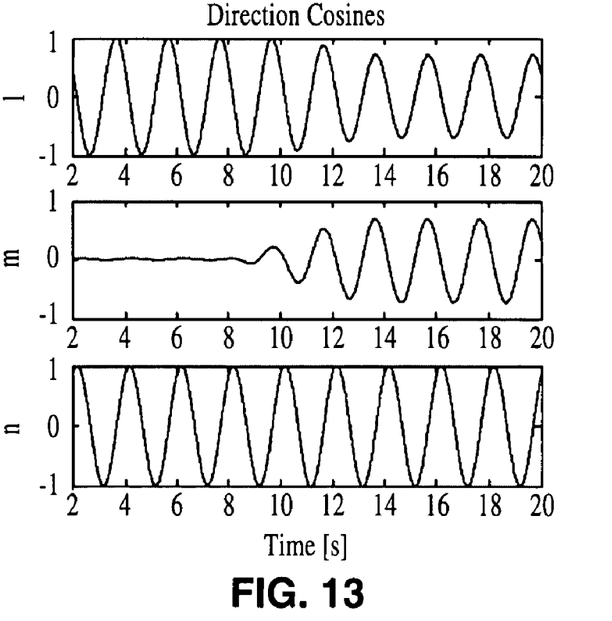
FIG. 13 is a graph of the direction cosines under orientation change.

The measured direction cosines for this motion are shown in FIG. 13. Note that, initially, the l and n components are 90° out of phase and are of the same magnitude, while the m component has zero magnitude, as expected. After approximately 9 seconds the precession of the axis begins, reaching the final orientation at approximately 13.5 seconds. In this time, the magnitude of direction cosine l decreases while the magnitude of direction cosine m increases. In the final orientation, l and m are in phase and are of the same magnitude, which is equivalent to the result of the oriented rotation described above. Also, through this transformation, direction cosine n remains unchanged.

Figure 14:
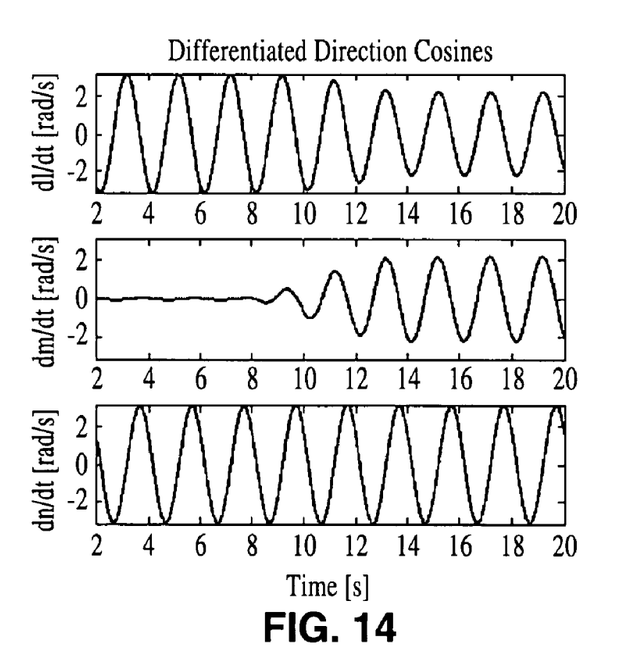
FIG. 14 is a graph of differentiated direction cosines under orientation change.

The differentiated direction cosines, shown in FIG. 14, are consistent, demonstrating the amplitude scaling by the rotation speed.

Figure 15:
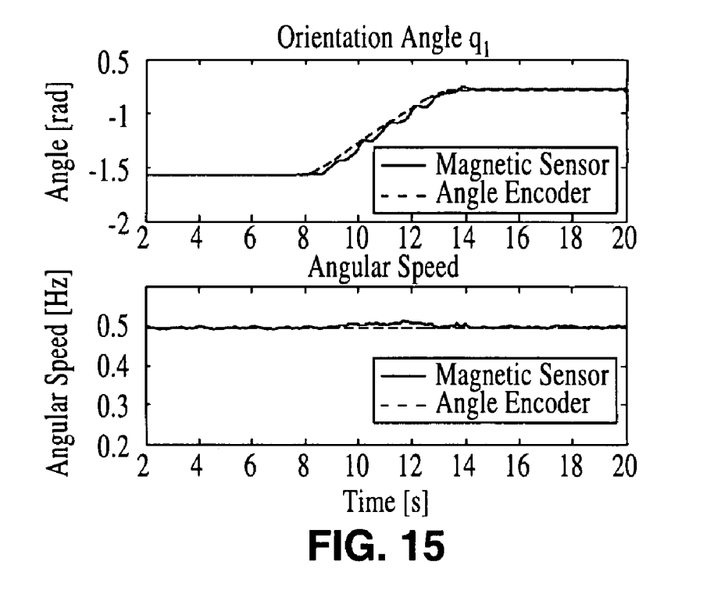
FIG. 15 is a graph of angular velocity vector components under orientation change.
Figure 16:
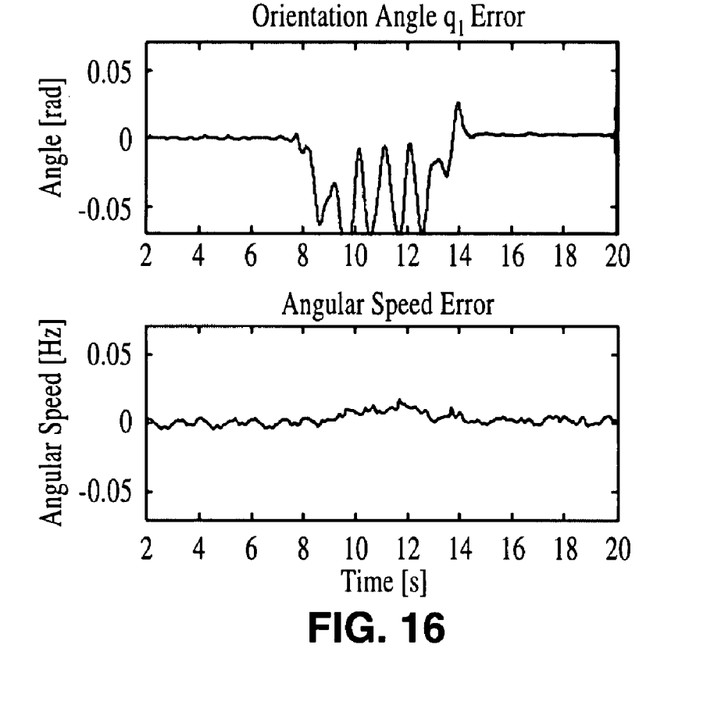
FIG. 16 is a graph of error in angular velocity vector components under orientation change.

The calculated angle $q_1$ and the angular speed $\|\omega\|$ are shown in the upper and lower plots of FIG. 15, respectively. The error in $q_1$ and $\|\omega\|$ are shown in the upper and lower plots of FIG. 16, respectively. Generally, the proposed sensor is able to track the precession. However, the sensor performance is compromised; noise spikes in the transient region are in excess of 5% error.

5.2. Step Change in Velocity

Figure 17:
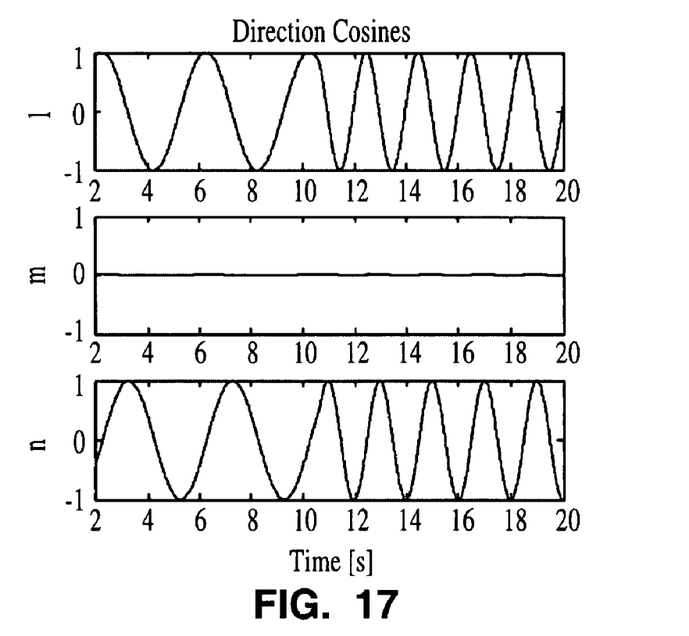
FIG. 17 is a graph of direction cosines under step change in velocity.

The present section is concerned with the tracking accuracy of the proposed magnetic sensor under a step change in velocity. For this analysis, the velocity will be stepped from $\|\omega\|=0.25$ Hz to $\|\omega\|=0.5$ Hz with $q_1=-\pi/2$ radians. The measured direction cosines for this motion are shown in FIG. 17. The step change occurs after approximately 10 seconds; note the distinct change in frequency of the signals. As expected, there is no change in the direction cosine magnitudes.

Figure 18:
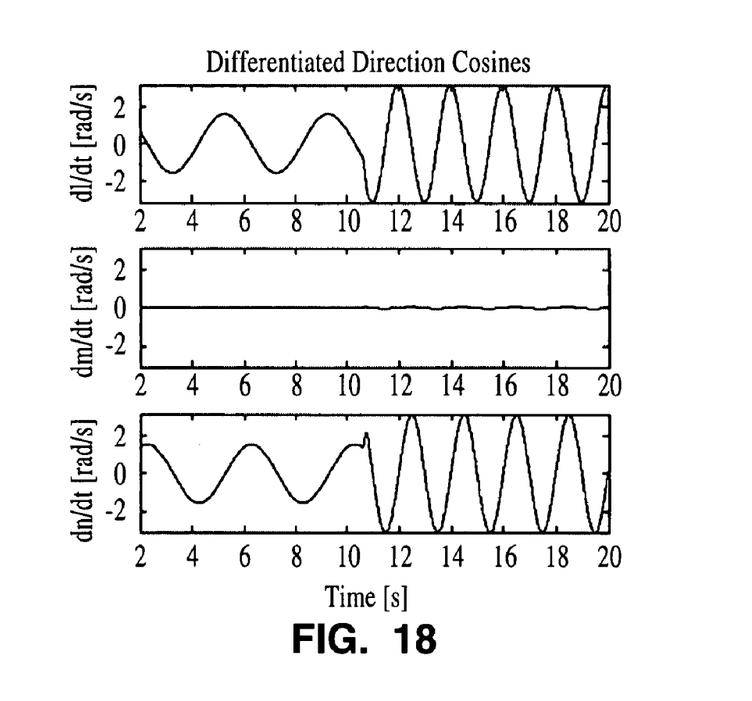
FIG. 18 is a graph of differentiated direction cosines under step change in velocity.

The differentiated direction cosines, shown in FIG. 18, are consistent, demonstrating the amplitude scaling by the rotation speed.

Figure 19:
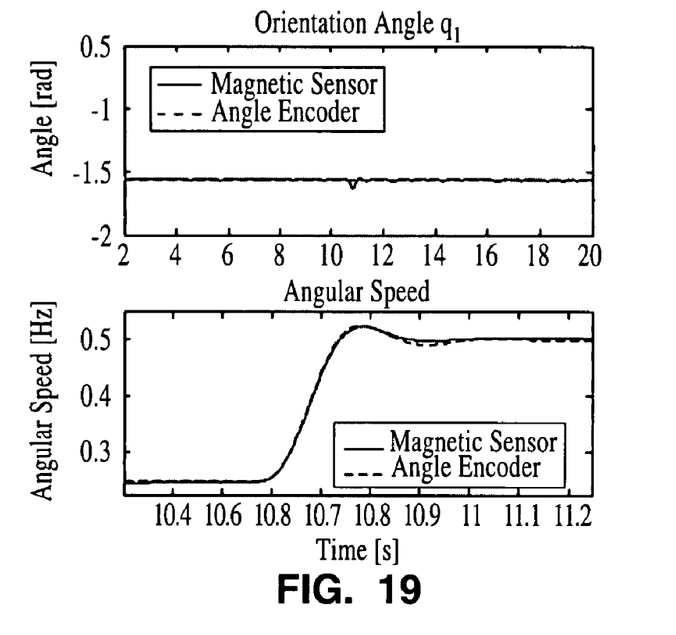
FIG. 19 is a graph of angular velocity vector components under velocity step change.

The calculated angle $q_1$ and the angular speed $\|\omega\|$ are shown in the upper and lower plots of FIG. 19, respectively. Generally, this result shows good correspondence between the proposed magnetic sensor and the reference signal from the optical encoders. As mentioned above, the motor cannot respond with an ideal step; there is an apparent transient response that is a product of the motor, gearbox, and magnet spindle inertias as well as the PI controller used to regulate the motor speed. However, it is apparent from FIG. 19 that the proposed sensor has the bandwidth to track this transient response.

Figure 20:
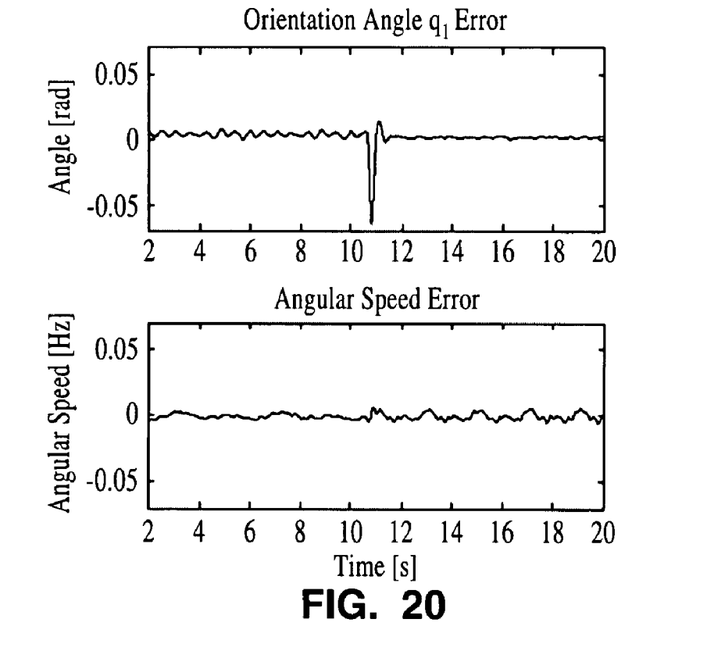
FIG. 20 is a graph of error in angular velocity vector components under velocity step change.

The error in $q_1$ and $\|\omega\|$ are shown in the upper and lower plots of FIG. 20, respectively. With the low-pass, Butterworth filtering of the raw data, as well as the low-pass filtering effects of the numerical differentiation filter, there is lag and magnitude attenuation of the output from the magnetic sensor scheme. As a result, there is a noticeable error across the step. In the steady-state regions, the proposed sensor can measure angle $q_1$ within 0.30% of its reference encoder value. However, in the transient region, the error causes an error spike of approximately 5% in the angle $q_1$. This is primarily attributed to amplification as this error is carried through the calculations for $q_1$.

Also note that no such noise spikes exist in the angular speed error plot. However, there is a distinct change in the error profile after the step. As described above, the magnetic sensor output for angular speed exhibits a periodic error at the operating frequency that results from variations at the direction cosine peaks. With the numerical differentiation, this noise is amplified or scaled by the rotation speed; consequently, the noise is proportional to the angular speed, which is apparent in FIG. 20. Of course, their relative error with respect to the nominal or reference speeds are similar. As a result, the proposed scheme can measure $\|\omega\|$ to within 0.50% of its reference encoder value for speeds up to 0.5 Hz.

6. Summary of Results

A novel three-dimensional, non-contact angular velocity sensor is presented hereinabove. The sensor was developed to track the rotation of the ball wheel mechanism, but can be used in any application involving rigid-body rotation about a fixed point, or spherical motion. First, a non-contact motion tracking scheme based on magnetometry was introduced. The field magnetic field measurements are used to determine the absolute orientation of the magnet axis, which provides the absolute orientation of a vector fixed relative to the sphere. Next, an approach based on the natural invariants of rigid-body transformations is used to solve the inverse kinematics problem of determining the angular velocity vector of the sphere from the spherical-motion data.

Experimental results demonstrated that the sensing scheme can accurately track the rotation of a magnet spinning at steady-state speeds and at constant orientations of the rotation axis. The scheme also provides reasonable tracking capabilities during transients regimes, such as step changes in velocity or precession of the rotation axis. One possible approach to improving the transient tracking accuracy is a predictive scheme that utilizes the physical system dynamics to estimate the precession rate. Information on the precession rate, then, provides a means of extracting, or decoupling, the wheel rotation from the axis precession.

In summary, the proposed sensing scheme is capable of tracking the motion of a magnet rotating at a relatively slow angular rate without contact. While there remain issues related to packaging the sensor for use outside the laboratory, the experimental results show that the technology is viable for tracking the rotation of body about an arbitrary axis.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art. In the appended claims, reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present disclosure and claims. Moreover, it is not necessary for a device or method to address each and every problem sought to be solved by the present invention, for it to be encompassed by the present disclosure and claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Nomenclature

| Symbol | Variable | units |
|---|---|---|
| $\{B_r, B_t\}$ | Radial-Tangential Components of Flux Density Vector | W/m² |
| $\{B_x, B_y, B_z\}$ | Orthogonal Components of Flux Density Vector | W/m² |
| $\hat{p}$ | Dipole Axis Unit Vector | unitless |
| $\{l, m, n\}$ | Direction Cosines | unitless |
| $\{\hat{i}, \hat{j}, \hat{k},\}$ | Inertial Reference Frame | unitless |
| $\{e_r, e_n, e_t\}$ | Rotating Reference Frame | unitless |
| $\underline{r}$ | Position Vector | m |
| $\underline{r}_\parallel$ | Component of Position Vector along Rotation Axis | m |
| $\underline{r}_\perp$ | Projection of Position Vector Orthogonal to Rotation Axis | m |
| $\hat{e}$ | Unit Vector Parallel to Rotation Axis | unitless |
| $\underline{v}_p$ | Tangential Velocity Vector of Point p | m/s |
| $\underline{\delta}_p$ | Displacement Vector of Point p | m |
| $\underline{\omega}$ | Angular Velocity Vector | rad/s |
| k | Sample Index | unitless |
| T | Sample Period | s |

TABLE 2

Experimental Parameters

| Symbol | Variable | Value |
|---|---|---|
| $f_s$ | Sampling Frequency | 500 Hz |
| ω | Input angular speed | 0.25 Hz-0.50 Hz |
| $q_1$ | Relative Orientation | 0 rad-π/4 rad |
| R | Distance between Magnet and Sensor | 0.30 m(12 in) |

TABLE 3

APS 535 Specifications

| | |
|---|---|
| Sensor Range | 0.02 to 5 Gauss |
| Output Range | ±10 V = ±5 Gauss |
| Sensitivity | 2 V/Gauss |
| Linearity | ±0.2% |
| Frequency Response | DC to 400 Hz (−3 dB) |

What is claimed is:

1. A motion tracking apparatus, comprising:
a sensor; and
means for determining an angular velocity vector for an object in real time;
wherein said object is configured for spherical motion;
wherein said sensor is not in contact with said object;
wherein said sensor takes a single flux density measurement, in three dimensions, of said object; and
wherein components of said angular velocity vector are determined from said single flux density measurement.

2. An apparatus as recited in claim 1, further comprising:
a magnet coupled to said object;
wherein said sensor comprises a tri-axial fluxgate magnetometer.

3. An apparatus as recited in claim 1, wherein said apparatus is configured for use in biomedical applications.

4. An apparatus as recited in claim 1, wherein said apparatus is configured for use in virtual reality and game applications.

5. An apparatus as recited in claim 1, wherein said apparatus is configured for use in military aircraft applications.

6. An apparatus as recited in claim 1, wherein said apparatus is configured for use in robotic applications.

7. An apparatus as recited in claim 1, wherein said sensor is operable in harsh or demanding physical environments.

8. An apparatus as recited in claim 1, wherein said apparatus is configured for tracking continuous motion in real time.

* * * * *